United States Patent
Chandhoke et al.

(10) Patent No.: US 11,803,456 B2
(45) Date of Patent: Oct. 31, 2023

(54) DISTRIBUTED EVENT-BASED TEST EXECUTION

(71) Applicant: NATIONAL INSTRUMENTS CORPORATION, Austin, TX (US)

(72) Inventors: Sundeep Chandhoke, Austin, TX (US); Gururaja Kasanadi Ramachandra, Bangalore (IN); Rajaramm Chokkalingam Malarvizhy, Tamil Nadu (IN); Varun Mehra, Bengaluru (IN); Bjoern Bachmann, Lichtenberg (DE)

(73) Assignee: National Instruments Corporation, Austin, TX (US)

( * ) Notice: Subject to any disclaimer, the term of this patent is extended or adjusted under 35 U.S.C. 154(b) by 233 days.

(21) Appl. No.: 17/464,419

(22) Filed: Sep. 1, 2021

(65) Prior Publication Data

US 2023/0063629 A1 Mar. 2, 2023

(51) Int. Cl.
*G06F 9/44* (2018.01)
*G06F 11/273* (2006.01)
*G06F 11/22* (2006.01)

(52) U.S. Cl.
CPC ...... *G06F 11/2733* (2013.01); *G06F 11/2242* (2013.01)

(58) Field of Classification Search
None
See application file for complete search history.

(56) References Cited

U.S. PATENT DOCUMENTS

| | | | |
|---|---|---|---|
| 2015/0302126 A1* | 10/2015 | Hamid | G06F 11/25 716/136 |
| 2019/0108116 A1* | 4/2019 | Benes | G06F 21/552 |
| 2022/0237111 A1* | 7/2022 | Stavros | G06F 21/64 |
| 2022/0253374 A1* | 8/2022 | Varanda | G06F 11/3684 |

FOREIGN PATENT DOCUMENTS

WO    WO-2016095554 A1 *  6/2016

OTHER PUBLICATIONS

"How do I develop Automated Production Test Systems with TestStand"; retrieved from <https://www.ni.com/en-us/shop/electronic-test-instrumentation/application-software-for-electronic-test-and-instrumentation-category/what-is-teststand/how-do-i-develop-test-validation-systems.html>; 2 pgs.

"GDE Test Sequencer"; Rohde & Schwartz; retrieved from <https://www.rohde-schwarz.com/us/applications/gde-test-sequencer-application-note_56280-15631.html>; 2 pgs.

(Continued)

*Primary Examiner* — Insun Kang
(74) *Attorney, Agent, or Firm* — Kowert, Hood, Munyon, Rankin & Goetzel, P.C.; Jeffrey C. Hood; Luke S. Langsjoen

(57) ABSTRACT

Methods and computing devices for allocating test pods to a distributed computing system for executing a test plan on a device-under-test (DUT). Each test pod may include a test microservice including one or more test steps and an event microservice specifying function relations between the test microservice and other test microservices. The test pods are allocated to different servers to perform a distributed execution of the test plan on the DUT through one or more test interfaces.

20 Claims, 9 Drawing Sheets

(56) References Cited

OTHER PUBLICATIONS

"Open Source Project for Test Automation"; OpenTap; retrieved from <https://www.opentap.io/>; 7 pgs.
"What are microservices?"; retrieved from <https://microservices.io>; 12 pgs.
"Containers"; retrieved from <https://kubernetes.io/docs/concepts/containers/>; Sep. 2020; 1 pg.
"What is Kubernetes"; retrieved from <https://kubernetes.io/docs/concepts/overview/what-is-kubernetes/>; Jul. 2021; 3 pgs.
"Apache Kafka"; Apache Software Foundation; retrieved from <https://kafka.apache.org/>; 4 pgs.
"Apache Pulsar"; The Apache Software Foundation; retrieved from <https://pulsar.apache.org/>; 3 pgs.
"RedPanda"; retrieved from <https://vectorized.io/redpanda/>; 5 pgs.
Barrett, "An Introduction to Directed Acyclic Graph"; retrieved from <https://cran.r-project.org/web/packages/ggdag/vignettes/intro-to-dags.html>; Oct. 2021; 11 pgs.
"What is a High Availability Cluster?"; NetApp, Inc.; retrieved from <https://cloud.netapp.com/blog/cvo-blg-high-availability-cluster-concepts-and-architecture>; Nov. 2020; 7 pgs.

* cited by examiner

US 11,803,456 B2

DISTRIBUTED EVENT-BASED TEST EXECUTION

TECHNICAL FIELD

The present disclosure is related to an event-based testing execution procedure distributed between a plurality of computing devices for a device-under-test (DUT).

DESCRIPTION OF THE RELATED ART

To ensure reliable performance of a product, quality control has become a major part of device manufacturing, validation and characterization. Therefore, each unit manufactured is tested under a number of conditions to ensure quality, validate performance, and/or characterize functionality. Each test plan may require one or more instruments to perform a specific sequence of measurements on a DUT. Based on the outcome of these measurements, a decision is made to mark the unit as pass or fail. Hence, manufacturing testing plays an important role in ensuring quality products in the marketplace. Manufacturing testing may occur for a plurality of different concurrent measurements, and each measurement may be configured with different measurement configurations.

A user that wishes to perform signal measurements may use hardware and software measurement systems to control certain aspects of the signal measurements. To reduce testing time, in some deployments a plurality of hardware and/or software systems may simultaneously perform signal measurements in parallel. However, coordinating the behavior of a plurality of measurement systems may be difficult. Accordingly, improvements in the field are desirable.

SUMMARY

Embodiments described herein relate to systems, memory media, and methods for allocating test pods to a distributed computing system for executing a test plan on a device-under-test (DUT).

In some embodiments, each test pod includes a test microservice including one or more test steps and an event microservice specifying function relations between the test microservice and other test microservices. The test pods are allocated to different servers to perform a distributed execution of the test plan on the DUT through one or more test interfaces. The distributed execution scheme may provide a scalable method to parallelize a complex test plan without utilizing a bottleneck centralized sequencer.

Note that the techniques described herein may be implemented in and/or used with a number of different types of DUTs, including but not limited to base stations, access points, cellular phones, portable media players, tablet computers, wearable devices, RF semiconductor components, RF power amplifiers, Front End Modules, transceivers, and various other computing devices.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed embodiments can be obtained when the following detailed description of the preferred embodiments is considered in conjunction with the following drawings.

Figure 1A:
FIG. 1A illustrates a computer system, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Terminology

The following is a glossary of terms used in the present document.

Device Under Test (DUT) or Unit Under Test (UUT)—A physical device or component that is being tested.

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Multiprocessor System—a computer system that includes multiple processing elements, i.e., processors, processing cores, or even networked computers, that may operate in a coordinated manner to execute program instructions concurrently.

Concurrently—a manner of performing actions or processes such that at least a portion of the (concurrent) processes overlap in time, e.g., at least one of the processes executes at least one iteration while another process executes an iteration. Concurrence, as used herein, may be accomplished in any of multiple ways, including through the use of single processor systems, e.g., via multi-threading, time-slices, etc., or multiprocessor (or multicore) systems, as well as any other technique for processing functions at the same time.

Function—a discrete set of one or more steps that form at least a part of a process.

Acquisition—refers to the acquiring of analog signals and converting the analog signals to digital data, e.g., bits.

Measurement Data Sets—the digital data resulting from an acquisition, including the "raw" digital bits and/or the digital bits converted via some scaling to any of a variety of formats, including voltages and other engineering units.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "graphical user interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window, panel, or dialog box having one or more GUI Elements, or may comprise a plurality of individual GUI Elements (or individual windows each having one or more GUI Elements), wherein the individual GUI Elements or windows may optionally be tiled together.

Graphical User Interface Element—an element of a graphical user interface, such as for providing input or displaying output. Exemplary graphical user interface elements include input controls and output indicators.

Input Control—a graphical user interface element for providing user input to a program. Exemplary input controls include buttons, check boxes, input text boxes, knobs, sliders, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data from a DUT. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

User Equipment (UE) (or "UE Device")—any of various types of computer systems devices which are mobile or portable and which performs wireless communications, such as mobile wireless devices. Examples of UE devices include mobile telephones (e.g., cellular telephones ("cell phones")) or smart phones (e.g., iPhone™ Android™-based phones), portable gaming devices (e.g., Nintendo DS™, PlayStation Portable™, Gameboy Advance™, iPod™), laptops, tablets (e.g., iPad™, Android™-based tablets), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

DETAILED DESCRIPTION

FIG. 1A: Computer System

FIG. 1A illustrates a computer system 82 configured to implement various embodiments. More specifically, the computer system 82 may be configured to execute one or more programs, e.g., one or more graphical data flow programs, to execute a measurement function (for example, in some embodiments, to test one or more devices under test (DUTs)), where the measurement function may include an acquisition sequence and a processing sequence.

As shown in FIG. 1A, the computer system 82 may include a display device. In some embodiments, the computer system 82 may be configured to display a (possibly graphical) program as the program is created and/or executed. The display device may also be configured to display a graphical user interface or soft front panel of the program during execution of the program. The graphical user interface may comprise any type of graphical user interface, e.g., depending on the computing platform.

The computer system 82 may include at least one memory medium on which one or more computer programs or software components according to one embodiment may be stored. The memory may be coupled to one or more processors and store program instructions executable by the one or more processors. For example, the memory medium may store one or more programs, e.g., graphical programs, which are executable to perform embodiments of the methods described herein. Additionally, the memory medium may store a programming development environment application used to create and/or execute such programs. The memory medium may also store operating system software, as well as other software for operation of the computer system. Various embodiments further include receiving or storing instructions and/or data implemented in accordance with the foregoing description upon a carrier medium.

Figure 1B:
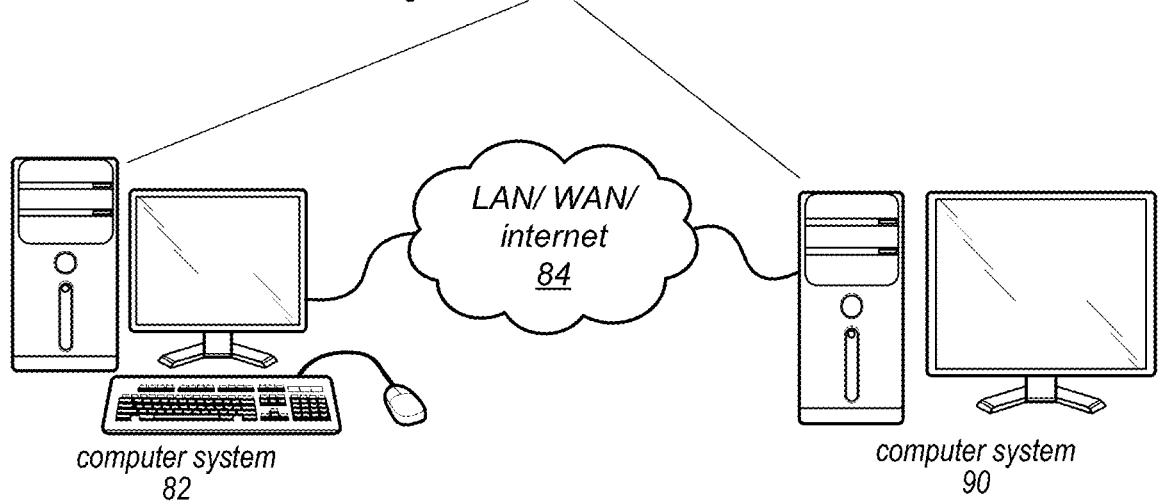
FIG. 1B illustrates a network system, according to some embodiments.

FIG. 1B: Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute programs, e.g., one or more graphical programs, in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the program and a soft front panel may be displayed on a display device of the computer system 82, and the block diagram may execute on a device coupled to the computer system 82. The device may include a programmable hardware element and/or may include a processor and memory medium which may execute a real time operating system. In one embodiment, the program may be downloaded and executed on the device. For example, an application development environment with which the program is associated may provide support for downloading a program for execution on the device in a real time system. It should be noted that while various embodiments are described herein in terms of a graphical program implementation, any other types of programs or programming technologies may be used as desired.

Figure 2:
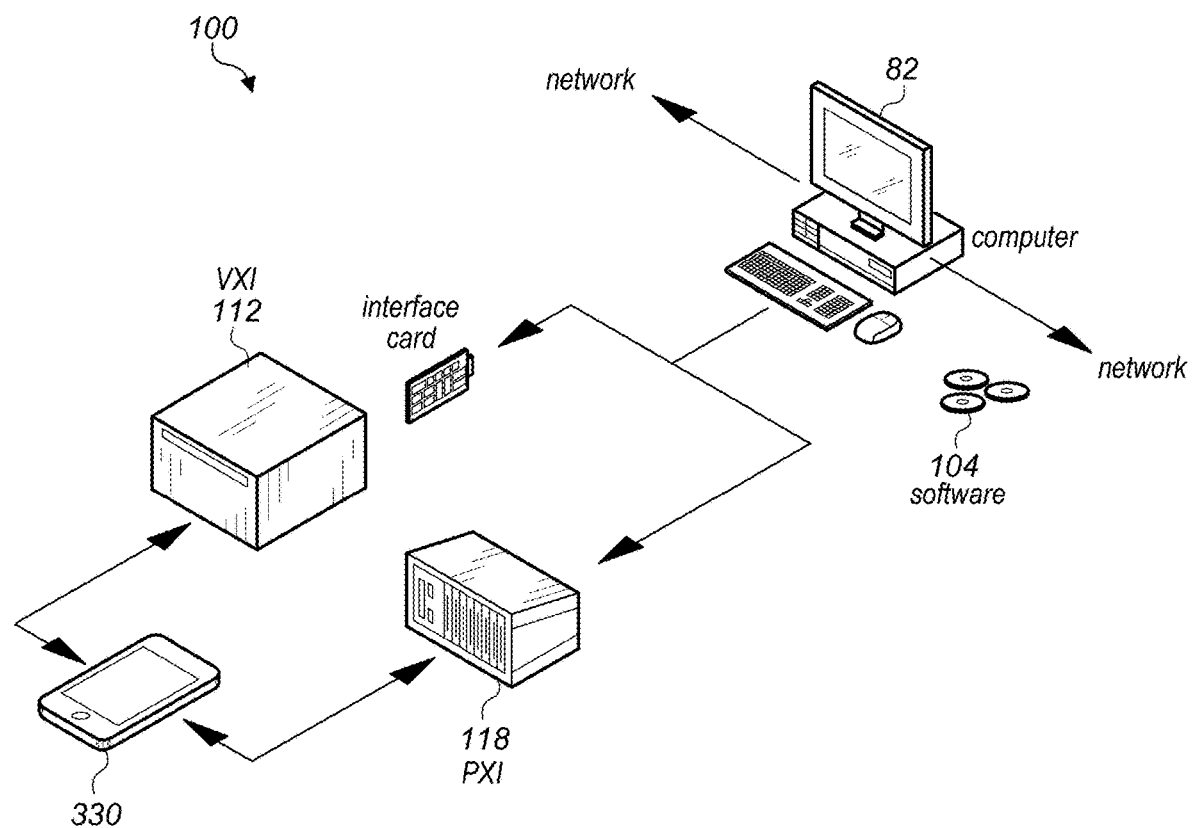
FIG. 2 is a schematic diagram showing a typical measurement setup, according to some embodiments.

FIG. 2—Exemplary Measurement System

FIG. 2 illustrates an exemplary measurement system that is configured to employ embodiments presented herein. A computer 82 may be used by a user to conduct the delay measurement process, and may be connected to a network and to the measurement apparatus. Software 104 may be installed on the computer to conduct the delay measurement process. The computer 82 may be connected to any of a variety of signal generating apparatuses, according to various embodiments. For example, the computer may be connected to a PXI 118 with configurable interface cards. Alternatively or additionally, the computer may be connected to a VXI 112 that is configured with interface cards. The PXI 118 and/or the VXI 112 may serve as waveform generators to supply a signal to the Device Under Test (DUT) 330. The VXI and/or PXI may further function as a vector signal analyzer (VSA), to receive and analyze an output signal from the DUT. The DUT may be any of a variety of electronic devices for which a measurement function is desirable. It should be noted that a DUT may be any of various types of computer systems devices which are mobile or portable and which performs wireless communications, such as mobile wireless devices. Examples of DUTs include mobile telephones (e.g., cellular telephones ("cell phones") or smart phones, portable gaming devices, laptops, tablets, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

In some embodiments, the signal generator and/or signal analyzer may be comprised within the computer 82, which may be directly connected to the DUT 330. A soft front panel, according to embodiments described herein, may be configured to display on a display device of the computer 82 (e.g., on a monitor or other display device).

In some embodiments, separate devices may be used to perform some of the functions (e.g. the AWG, VSG, VSA, etc.) described above. These dedicated devices, which may be known in the art as "box" type instruments, may also be connected to a computer system. In some embodiments, the connected computer system may be configured to receive outputs from or provide inputs to the dedicated instruments. The connected computer system may also, in some embodiments, collect and store data or display outputs from the devices.

In one embodiment, the system may include a memory, e.g., a non-transitory computer accessible memory medium, coupled to one or more processors, where the memory stores program instructions which may be executable by the one or more processors to implement embodiments of the testing method disclosed herein. For example, in one embodiment, the program instructions may be executable to provide a test sequence. The test sequence may include an acquisition sequence and a processing sequence. The acquisition sequence may include a sequence of acquisition functions for performing acquisitions on one or more DUTs, such as UE devices 514a-514d. The processing sequence may include a sequence of processing functions for processing measurement data resulting from the acquisitions.

In one embodiment, at least one processing function of the processing sequence may be performed concurrently with at least one acquisition function of the acquisition sequence. It should be noted that, as defined above, concurrently means that at least a portion of the (concurrent) processes overlap in time. Alternatively, in one embodiment the execution of the acquisition sequence and the processing sequence may be completely separate (temporally), where the acquisition sequence may be completed prior to any processing function being performed.

Automated Testing Procedures

Automated testing procedures traditionally make use of some form of sequencing software (e.g., a sequencer) which manages the sequence in which the test code gets executed. This sequence may be created as part of a test plan which describes the order in which test codes should be run to test a Device-Under-Test (DUT).

This model may work well in a single-server-based architecture where the sequencing software is running on the same host machine as the test code. However, as an automated testing procedure is scaled to execute as part of a distributed system (e.g., on multiple servers), this sequencer-based model may suffer from several drawbacks. For example, the sequencer represents a single source of failure wherein if the sequencer is interrupted the entire testing procedure will come to a halt. In some prior art methods, complex schemes are utilized to ensure the sequencer is highly-available and resistant to interruptions. Additionally, the sequencer represents a performance bottleneck, as the sequencer obtains knowledge of all server instances and test code (modules) to direct the testing procedure. Additionally, a centralized sequencer methodology that directs the testing procedure executed by a plurality of distributed computing elements may be difficult to scale, as the sequencer may have to edit and/or modify the entire sequencer file when adding or modifying the testing procedure.

Embodiments herein present methods and devices for performing distributed event-based test execution in which the test code is sequenced using asynchronous events, eliminating the need for centralized sequencing software. In exemplary embodiments, the test plan is decomposed into events which may be assimilated as part of the test code itself. This enables the test applications to scale larger without necessitating centralized execution control.

Figure 3:
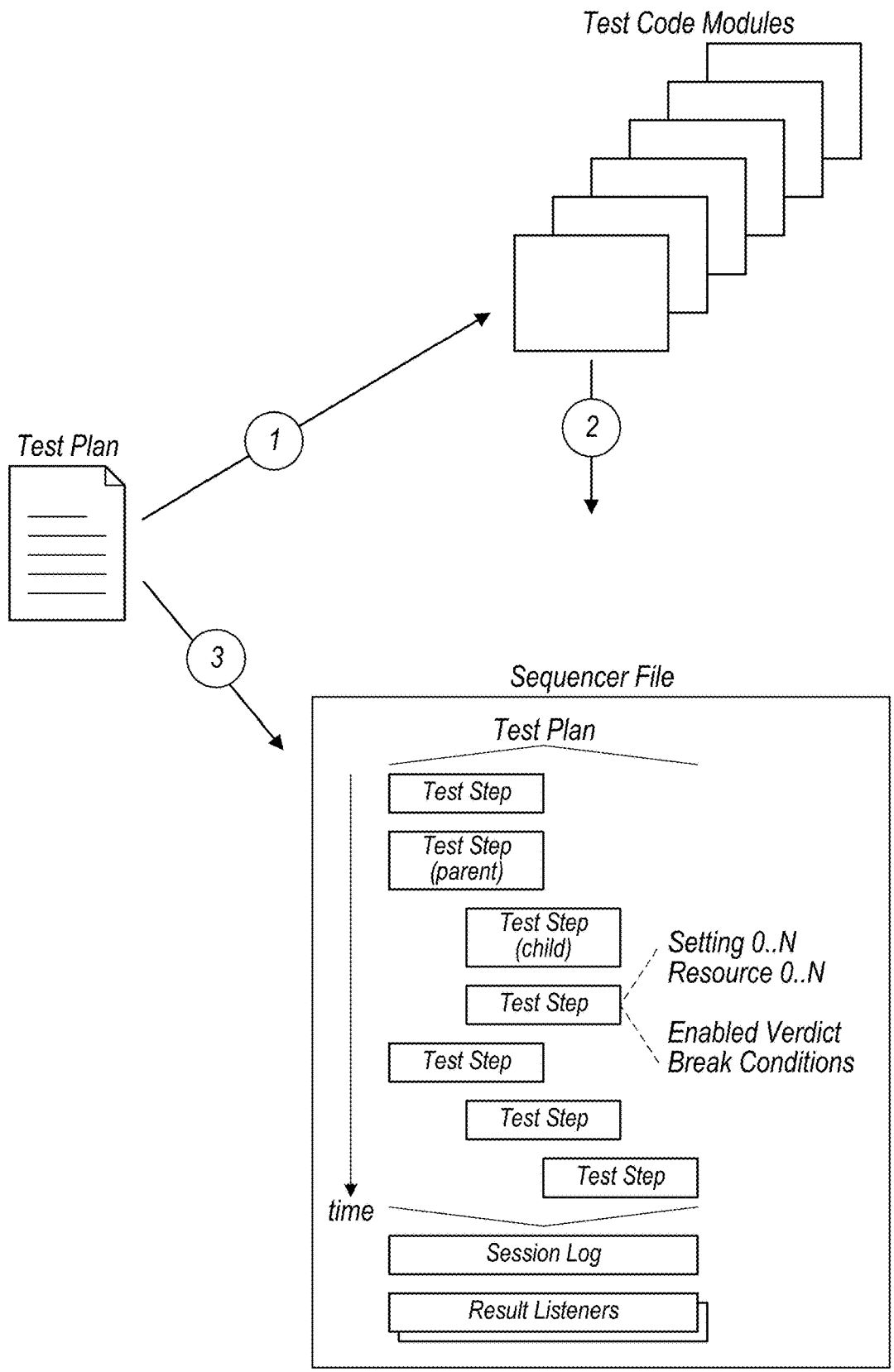
FIG. 3 is a schematic diagram illustrating a legacy method for constructing a sequencer file from a test plan.
Figure 4:
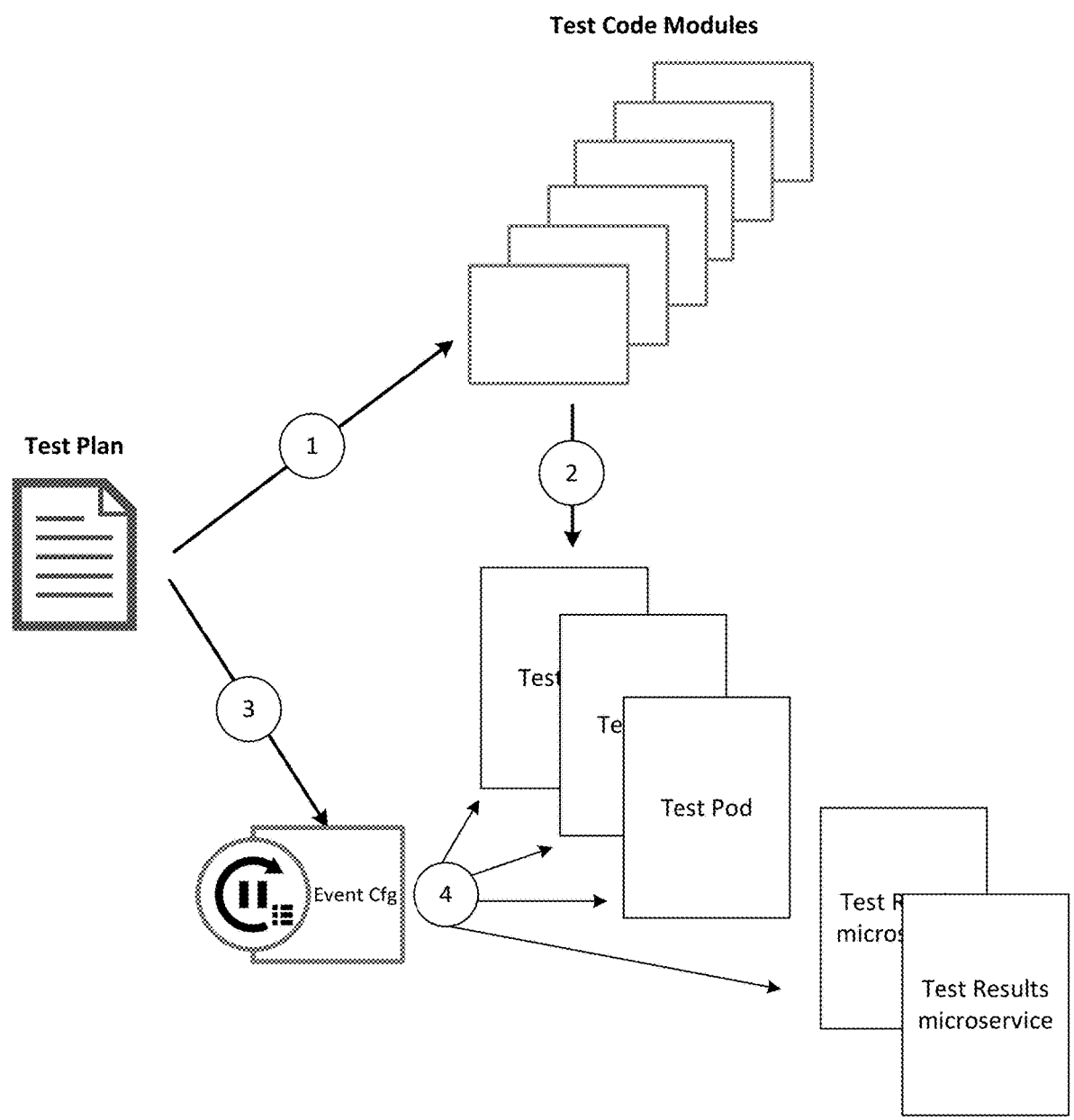
FIG. 4 is a schematic diagram illustrating a method for constructing test pods from a test plan, according to some embodiments.

In some existing implementations, automated test software utilizes an off-the-shelf or a home-grown test sequencing software to test a DUT, wherein the test sequence is configured from a test plan describing how the DUT is to be tested. However, these off-the-shelf sequencers are typically configured using the test plan and test code modules and are controlled by a centralized sequencer. FIG. 3 illustrates an exemplary prior art method for generating a sequencer file based on a test plan. As illustrated, the sequence file contains test steps that execute the test code. An execution engine is used to parse the sequence file and execute the test steps in the order defined in the file.

This sequence file-based approach suffers from the drawbacks mentioned above when using multiple servers to execute the test code (i.e., when different servers execute different respective test steps of the sequencer file). To address these and other concerns, embodiments herein describe an asynchronous event-based model to parallelize execution of a test plan.

Figure 5:
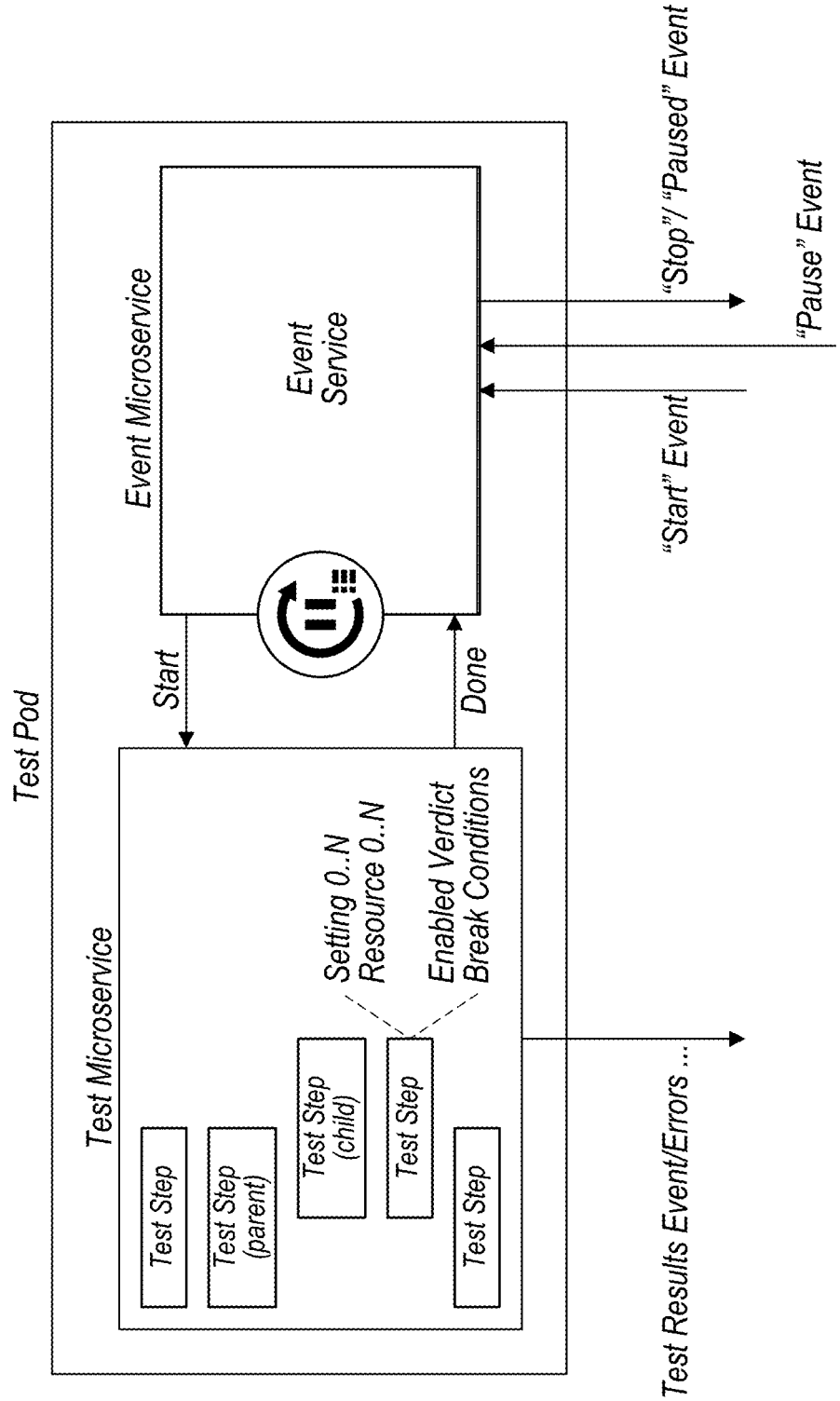
FIG. 5 is a schematic illustration of a test pod, according to some embodiments.

In some embodiments, rather than creating a sequence file, an event configuration is created based on the test plan. The test code is divided into a plurality of test and event microservices which may be built using modern computing infrastructure such as Containers provisioned using Container orchestration tools like Kubernetes. Each test microservice may include of one or more test steps that execute when the test microservice executes. Each test microservice is coupled within a "test pod" with an event microservice (i.e., an event handler service) which waits for completion of a first event to begin execution, as shown in FIG. 5. The test microservice and the event microservice together constitute a test pod. When the test steps contained in the test microservice are done executing, the event microservice generates a second event which is output and may be received by a different test pod as an event to trigger execution of its test microservice. Additionally, each test microservice may generate one or more test result and/or error events, which may be output and used to indicate one or more statuses of the test. These results may be received by independently running test result microservices which may log the result, do further analysis, or display the results on a dashboard. FIG. 5 further illustrates that the event microservice may receive either a "start" event from another test pod (e.g., in response to the other test pod completing its test microservice) to trigger the start of the illustrated test microservice, or a "pause" event from the other test pod (e.g., in response to the other test pod completing or obtaining an error in its test microservice) to pause the illustrated test microservice. Finally, the event microservice may output a "stop" or "paused" event to other test pods in response to the illustrated test microservice being completed or paused, respectively. FIG. 5 is exemplary only and other sets of events that the event microservice may subscribe to or produce are also within the scope of the present disclosure.

The event configuration data may be saved (as a file) as a collection of test pods and may be reused. However, it differs from a test sequencer file in that it does not require an execution engine. Rather, it simply contains information (that is used exclusively at configuration time) related to which events a test microservice should wait for to start execution and which events it should generate when it completes its execution. Additionally, it may contain the mapping between different events, i.e., which completion event from a test microservice triggers the start event for another test microservice. The test steps may be documented or managed separately from the execution process of the plurality of test pods. Another advantage of embodiments described herein over traditional usage of a test sequencer file is that the independent modular nature of test pod allocation naturally supports parallelization of multiple test pods and/or test plans. For example, in traditional sequencing processes, concurrent execution of test steps is explicitly specified. In contrast, all test pods may be executed concurrently by default, responsive to their respective event triggers. Advantageously, multiple instances of a test microservice may be spawned to run in parallel on multiple DUTs simultaneously. This may be accomplished in traditional sequencing methodologies with explicit step-by-step instructions, which adversely impacts scalability. Additionally, or alternatively, multiple test microservices may be executed concurrently on a single DUT.

Figure 6:
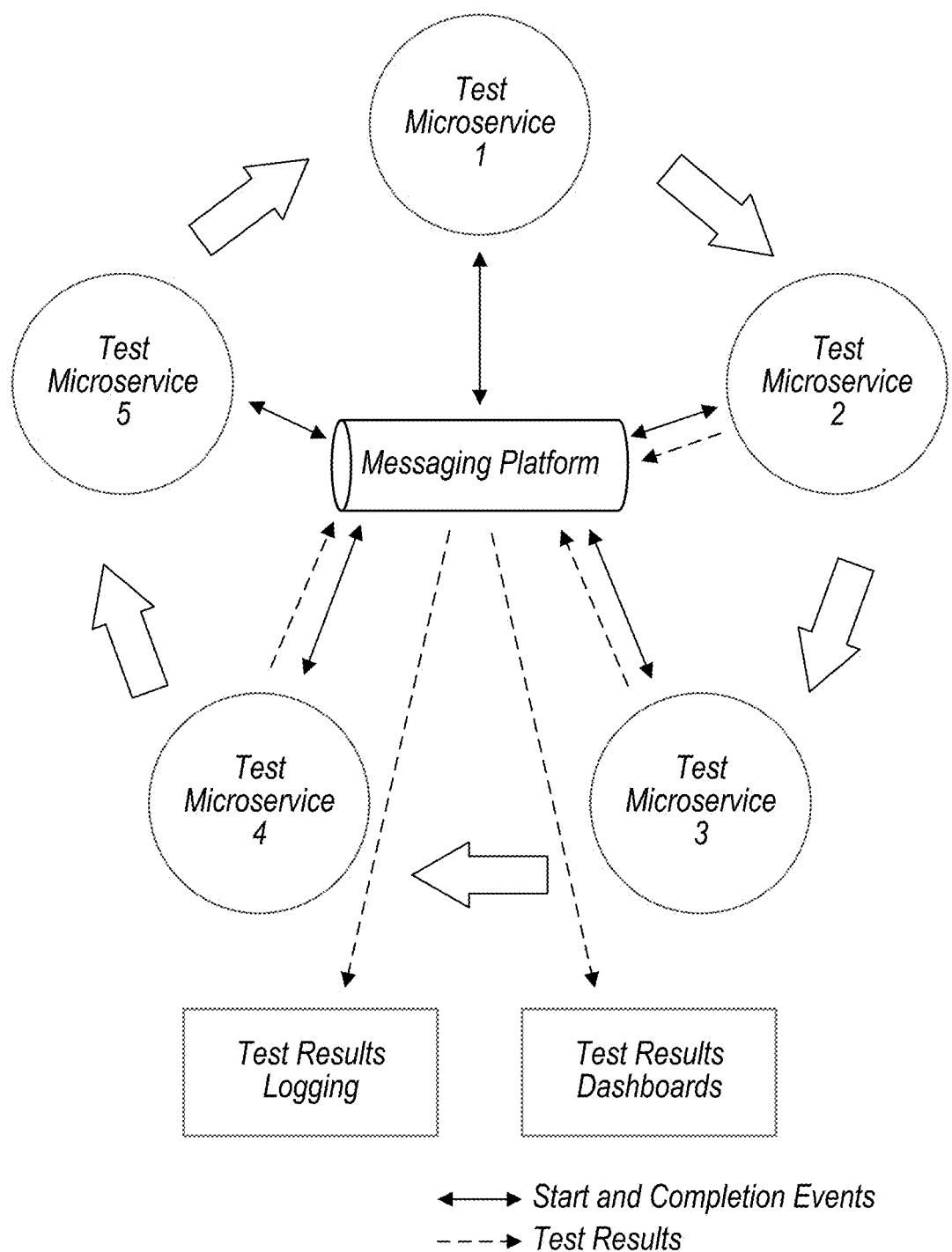
FIG. 6 is a schematic illustration of interrelations between a plurality of test microservices and a messaging platform, according to some embodiments.

FIG. 6 illustrates an example of a mapping of events done via an event configuration, according to some embodiments. As illustrated by the broad arrows, completion of test service 1 triggers a start event for test service 2, completion of test service 2 triggers a start even for test service 3, and so on. A user may explicitly provide a trigger to start the test plan, which provides execution instructions for the first iteration a test service. This can be any one of the services, based on the test application requirements and the sequencing desired from the test plan of the DUT. In the example testing procedure shown in FIG. 6, the test microservices will cycle clockwise repeatedly while providing, logging, and/or displaying test results. To stop execution of the sequence, the user may program one of the test microservices to stop generating further events (for example, when all the desired DUTs have been tested), or use a user interface (e.g., as part of a web browser) to explicitly send an event to terminate all the microservices. FIG. 6 further illustrates a messaging platform, which is software configured to receive event indications from each of the event microservices and provide the event indications to the other event microservices. The messaging platform may execute on a computing device coupled to the plurality of parallelized computing devices. The messaging platform additionally provides test results to memory for logging and/or a dashboard for real-time visualization.

The start and completion events described herein may be a set of events understood as singular entities to explain the flow of the sequence. More generally, complex event mappings may be created to handle various if-else scenarios and/or to accommodate waiting on multiple events. This model of test execution may be scaled limitlessly without having any singular centralized point of control. Each test microservice may be easily replicated to provide high availability.

In some embodiments, the test steps exchange data amongst each other (e.g., global variables, state information). This kind of shared data may be implemented as additional events which are persisted by the messaging platform as a data log. Advantageously, this may allow the test pods to access the data multiple times on an as-needed basis.

Figure 7:
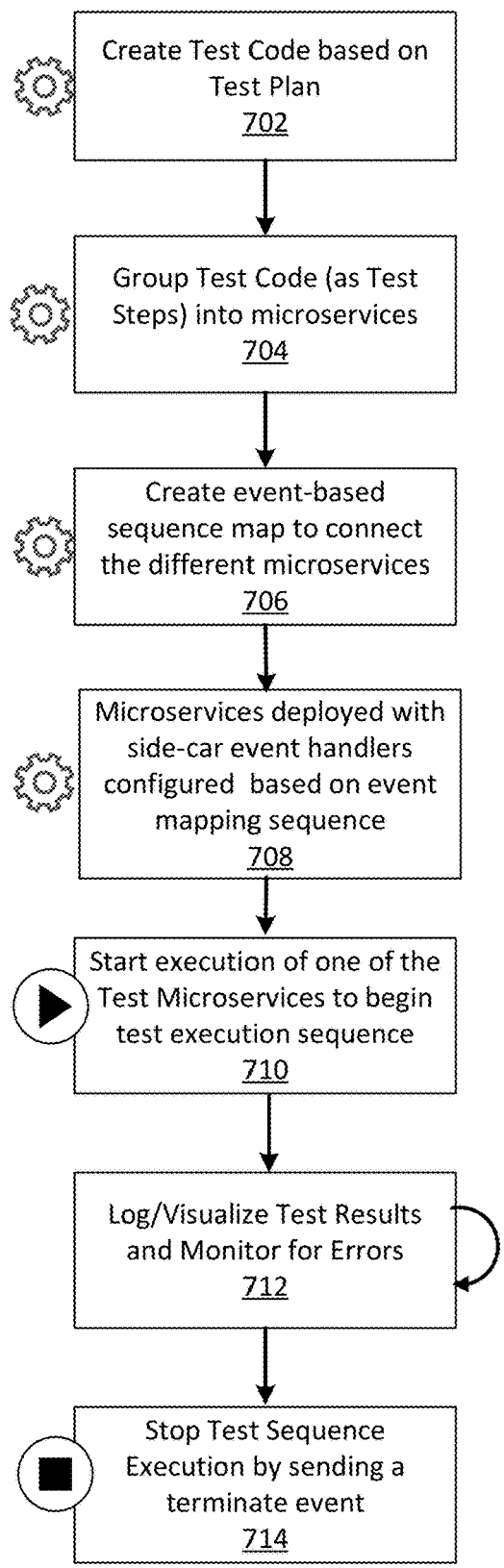
FIG. 7 is a flowchart diagram illustrating both configuration-time and run-time steps for distributed test plan execution, according to some embodiments.

FIG. 7 is a flowchart diagram illustrating a sequence of steps to configure and run a test sequence, according to some embodiments. The first four steps 702-708 (marked with a gear) are executed at configuration time (i.e., prior to run-time of the test plan). After the configuration is complete, the final three steps 710-714 execute during run-time of the test plan. Once the test plan is initiated, it continues to execute as per the event mapping scheme. Stopping the sequence may be explicit as shown in the FIG. 7, or it may be implicit through event generation by one of the microservices (for example, when the list of all DUTs to be tested is complete, one of the test microservices may issue a terminate event, or it may refrain from sending the event to start the next test iteration until a user logs in and initiates a new iteration).

Figure 8:
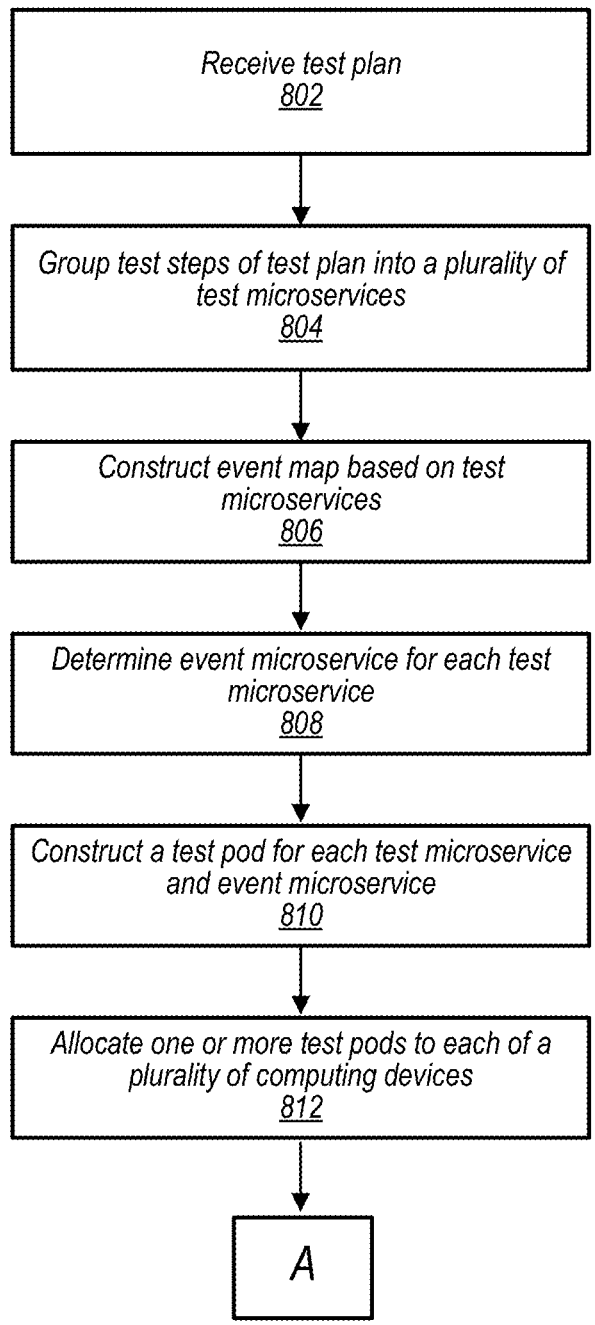
FIG. 8 is a flowchart diagram illustrating a method for allocating test pods for a test plan on a DUT to parallelized servers of a distributed computing system, according to some embodiments.

FIG. 8: Flowchart of a Method for Distributed Test Pod Allocation

FIG. 8 is a flowchart diagram illustrating a method for allocating test pods for a test plan on a DUT to parallelized servers of a distributed computing system, according to some embodiments. The distributed computing system may include a plurality of parallel servers that are each coupled to each other and one or more test interfaces, such the VXI 112 or PXI 118 illustrated in FIG. 2. The test interfaces are coupled to the DUT and are configured to perform test steps of the test plan on the DUT. The method steps described in FIG. 8 may operate at configuration time, i.e., prior to run time of the test plan. The method steps of FIG. 8 may be executed once prior to executing a test plan, and the resulting test pod allocation may be subsequently utilized a plurality of times to execute the test plan on a plurality of respective DUTs.

The method shown in FIG. 8 may be used in conjunction with any of the computer systems or devices shown in the above Figures, among other devices. For example, a non-transitory computer-readable memory medium may have stored thereon program instructions which, when executed by a processor, are configured to cause a computing device to perform the described method steps. In various embodiments, some of the method elements shown may be performed concurrently, in a different order than shown, or may be omitted. Additional method elements may also be performed as desired. As shown, this method may operate as follows.

At 802, a test plan is received for testing a device-under-test (DUT). The test plan includes a plurality of test steps, where each test step is a specific test to be performed on the DUT (e.g., measure transmission power, trigger current and measure voltage, etc.). The test plan may include a specific sequence of test steps, where certain test steps must be successfully completed prior to execution of a subsequent test step. The test steps may each measure, stimulate or test any of a variety of properties or behaviors of the DUT.

At 804, the plurality of test steps is grouped into a plurality of test microservices, where each test microservice includes one or more test steps. Each test microservice of the plurality of test microservices may be a functionally independent subset of the plurality of test steps. As one example, a specific sequence of three test steps may operate as a functionally independent unit wherein, when the first test step of the sequence is initiated, the remaining test steps may follow regardless of the results or lack thereof of any other test steps of the test plan outside of the test microservice.

At 806, an event map is constructed based on the plurality of test microservices. The event map specifies functional relations for an ordered execution of the plurality of test microservices according to the test plan. The functional relations for the ordered execution of the plurality of test microservices may include conditions for initiating respective ones of the plurality of test microservices, wherein the conditions are based at least in part on successful completion of other ones of the plurality of test microservices. Said another way, the event map may include a variety of functional dependencies regarding when each test microservice is to be initiated (e.g., test microservice B should be initiated upon completion of test microservice A, test microservice E should be initiated upon completion of test microservices C and D, etc.).

At 808, for each of the plurality of test microservices, a respective event microservice is determined. The respective event microservice specifies a subset of the event map referent to the respective test microservice. For example, the event microservice may include the portions of the event map that make reference to the respective test microservice. Each event microservice may specify a trigger to initiate the respective test microservice responsive to receiving an indication of completion of a particular other test microservice, a trigger to pause the respective test microservice responsive to receiving an indication of a status change for another test microservice, and/or a trigger to output a stop event indicating completion of the respective test microservice. The stop event may be output to one or more other computing devices for provision to their respective test pods.

At 810, for each of the plurality of test microservices, a test pod is constructed that includes the respective test microservice and the respective event microservice. The plurality of test pods may be stored in a memory medium. The test pods may further include software configured to output one or both of test results and test errors of the respective test microservice. Within each test pod, the test microservice and the event microservice may be coupled such that the event microservice can provide start, stop and pause commands to the test microservice and the test microservice can provide completion and error indications to the event microservice. The event microservice may be configured to communicate with other test pods stored at the same or different computing devices, to both receive and provide event indications.

At 812, one or more test pods are allocated to each of a plurality of computing devices for executing the test plan on the DUT. The plurality of computing devices may be a plurality of parallel computing servers mutually coupled to one another. Each computing device may store its allocated one or more test pods in memory, and may utilize the test pods during run time to execute their allocated portion of the test plan.

In some embodiments, the method further includes receiving user input to initiate execution of the test plan and providing a trigger to one or more of the computing devices to execute one or more test microservices. During execution of the test plan, the parallel computing servers may provide event indications to each other based on completion, pausing, and/or errors related to execution of the test microservices contained in the respective test pods of the servers. In some embodiments, one of the computing devices may execute a messaging platform that receives event updates from the test pods during execution of the test plan and, in response, provides event triggers to one or more test pods to initiate their respective test microservices. In some embodiments, the messaging platform may provide these event triggers to all of the test pods, and the test pods may determine whether the event trigger is relevant to their respective test microservice (i.e., whether the event trigger triggers execution of their test microservice). Alternatively, the messaging platform may exclusively provide the event trigger only to those test pods for whom the event trigger is relevant (i.e., for which the event trigger will initiate execution of the test microservice of the test pod).

Test results may be received from the plurality of test pods during execution of the test plan, and the received test results may be stored in a memory medium and/or displayed on a display dashboard to provide run-time result feedback. Distributed execution of the test plan is described in more detail in reference to FIG. 9, below.

Figure 9:
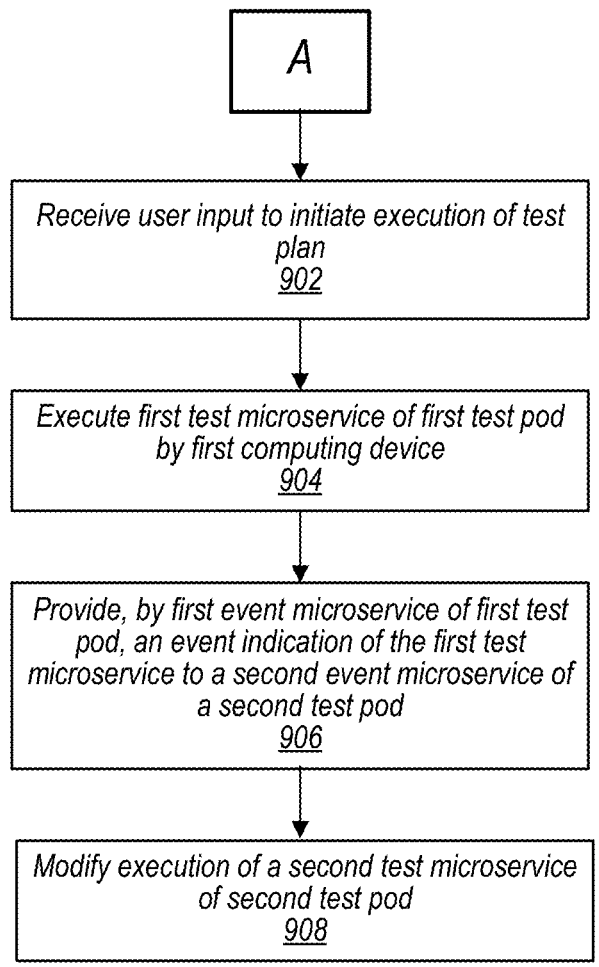
FIG. 9 is a flowchart diagram illustrating a method for executing a test plan on a DUT using a distributed computing system, according to some embodiments.

FIG. 9: Flowchart of a Method for Distributed Test Plan Execution

FIG. 9 is a flowchart diagram illustrating a method for executing a test plan on a DUT using a distributed computing system, according to some embodiments. The distributed computing system may include a plurality of computing devices (e.g., parallel servers) that are each coupled to one or more test interfaces, such the VXI 112 or PXI 118 illustrated in FIG. 2. The test interfaces are coupled to the DUT and are configured to perform test steps of the test plan on the DUT. The distributed computing system may further include a computing device configured to receive user input and display a results on a dashboard to present run-time results of the test plan. This computing device may store a messaging platform, as described in greater detail above.

The method shown in FIG. 9 may be used in conjunction with any of the computer systems or devices shown in the above Figures, among other devices. For example, each of the parallel servers may include a non-transitory computer-readable memory medium with stored program instructions which, when executed by a processor, are configured to cause the parallel computing devices to perform the described method steps. The memory media of each parallel computing device may have stored thereon one or more test pods (e.g., allocated as described in FIG. 8, above). Each test pod may include an event microservice and a test microservice associated with the event microservice. Each test microservice may include one or more functionally independent test steps of the test plan. In various embodiments, some of the method elements shown may be performed concurrently, in a different order than shown, or may be omitted. Additional method elements may also be performed as desired. As shown, this method may operate as follows.

At 902, user input is received to initiate execution of the test plan. The user input may be received by a controller computing device that is coupled to the plurality of parallelized servers that store the test pods. The controller computing device may provide an indication to initiate the test plan to one or more of the parallelized servers.

At 904, responsive to receiving the user input, a first test microservice of a first test pod is executed by a first computing device of the plurality of computing devices. The first test microservice may include one or more test steps executed on the DUT as directed by the first computing device through one or more test interfaces.

At 906, a first event microservice of the first test pod provides an event indication to a second event microservice of a second test pod stored on a second computing device responsive to an event update for the first test microservice. For example, the event indication may indicate that the first test microservice has either been completed, paused, or had an error, in various embodiments.

At 908, a second computing device of the plurality of computing devices receives the event indication and modifies its test behavior. When the event indication indicates completion of the first test microservice, modifying execution of the second test microservice may include initiating execution of the second test microservice. When the event indication indicates an error in executing the first test microservice, modifying execution of the second test microservice may include pausing execution of the second test microservice. When the event indication indicates a pause in executing the first test microservice, modifying execution of the second test microservice may include pausing execution of the second test microservice. In some embodiments, the event indication may include additional information related to execution of the first test microservice. For example, the event indication may indicate a quantitative result of the first test microservice that may modify one or more parameters of the second test microservice. Alternatively, the event indication may be a partial trigger to initiate execution of the second test microservice, and the second test pod may additionally wait for a second event indication indicating completion of a third test microservice (or potentially two or three additional event indications from multiple test microservices, etc.) prior to executing the second test microservice. These embodiments may be further generalized to additional logical conditions on execution, pausing, and halting test microservices, as desired.

For clarity, the methods of steps 904-908 describe a two-party interaction between a first test pod executing on a first computing device with a second test pod executing on a second computing device. Typical test plans will be allocated to a much larger number of test pods that are stored on more than two parallelized computing devices. For these test plans, the method described in FIG. 9 may be generalized to include a more complex "web" of interactions between various test pods stored on various computing devices. In other words, the methods of FIG. 9 are intended to provide a detailed example of a specific dependency between two test pods, but more generally the method is extended to incorporate multiple interactions between a larger number of test pods and respective computing devices, as indicated by the specifics of the test plan.

In some embodiments, analytics may be performed during execution of the test plan to improve performance and/or efficiency of test plan execution. For example, analytics may be used to detect that certain test steps may be superfluous (e.g., because they consistently pass, i.e., pass for a predetermined consecutive number of subsequent iterations), and feedback may be provided to skip or disable these superfluous test steps for the remainder of the test plan execution.

Analytics may be performed by an analytics data platform instantiated in software on a computing device that is coupled to the messaging platform and the plurality of parallelized computing devices. In some embodiments, the analytics data platform may receive test results from the plurality of test pods and make a determination that a first test step of a first test pod may be skipped. The analytics platform may output this information as an event to the messaging platform. The test microservices may subscribe to these events and use this information internally to skip test steps, as indicated by the event.

The methods described in FIG. 9 relate to execution of a single test plan on a single DUT. However, these methods may be enhanced to include parallel test plan execution on multiple DUTs. Advantageously, the modular allocation and execution of test pods may facilitate parallel execution of multiple test plans on multiple DUTs. For example, a second test plan may be received that includes a plurality of test pods related to testing a second DUT, and these test pods may be allocated among the plurality of parallelized computing devices, to execute simultaneously with the test pods of one or more other test plans for one or more other respective DUTs. Additionally, or alternatively, multiple test plans may simultaneously execute on a single DUT.

Embodiments of the present disclosure may be realized in any of various forms. For example, in some embodiments, the disclosed techniques may be realized as a computer-implemented method, a computer-readable memory medium, or a computer system. In other embodiments, the disclosed techniques may be realized using one or more custom-designed hardware devices such as ASICs. In other embodiments, the disclosed techniques may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computing device may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms. For example, the computer system may be a personal computer (in any of its various realizations), a workstation, a computer on a card, an application-specific computer in a box, a server computer, a client computer, a hand-held device, a mobile computing device, a tablet computer, a wearable computer, etc.

In some embodiments, a set of computers distributed across a network may be configured to partition the effort of executing a computational method (e.g., any of the method embodiments disclosed herein).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The invention claimed is:

1. A non-transitory computer-readable memory medium storing program instructions which, when executed by a processor, are configured to cause a first computing device to:
   receive a test plan for testing a device-under-test (DUT), wherein the test plan comprises a plurality of test steps;
   group the plurality of test steps into a plurality of test microservices, wherein each test microservice comprises one or more test steps;
   construct an event map based on the plurality of test microservices, wherein the event map specifies functional relations for an ordered execution of the plurality of test microservices according to the test plan;
   for each of the plurality of test microservices:
      determine a respective event microservice corresponding to a respective test microservice of the plurality of test microservices, wherein the respective event microservice comprises a respective subset of the event map referent to the respective test microservice; and store a respective test pod comprising the respective test microservice and the respective event microservice in the memory medium; and allocate one or more test pods stored in the memory medium to each of a plurality of computing devices for executing the test plan based on the one or more test pods on the DUT.

2. The non-transitory computer-readable memory medium of claim 1, wherein each event microservice comprises one or more of:

a trigger to initiate the respective test microservice responsive to receiving an indication of completion of a first test microservice;

a trigger to pause the respective test microservice responsive to receiving an indication of a status change for a second test microservice; and a trigger to output a stop event indicating completion of the respective test microservice.

3. The non-transitory computer-readable memory medium of claim 1, wherein one or more test pods further comprise:

software configured to output one or both of test results and test errors of the respective test microservice.

4. The non-transitory computer-readable memory medium of claim 1, wherein the functional relations for the ordered execution of the plurality of test microservices comprise conditions for initiating respective ones of the plurality of test microservices, wherein the conditions are based at least in part on successful completion of other ones of the plurality of test microservices.

5. The non-transitory computer-readable memory medium of claim 1, wherein each test microservice of the plurality of test microservices comprises a functionally independent subset of the plurality of test steps.

6. The non-transitory computer-readable memory medium of claim 1, wherein the program instructions are further executable to cause the first computing device to:

receive user input to initiate execution of the test plan; and responsive to receiving the user input to initiate execution of the test plan, provide a trigger to one or more of the computing devices to execute one or more test microservices.

7. The non-transitory computer-readable memory medium of claim 1, wherein the program instructions are further executable to cause the first computing device to: receive test results from the one or more test pods during execution of the test plan; responsive to receiving the test results: store the test results in the memory medium; and display the test results on a display.

8. The non-transitory computer-readable memory medium of claim 1, wherein the program instructions are further executable to cause the first computing device to: receive event updates from the one or more test pods during execution of the test plan; and responsive to receiving the event updates, provide event triggers to the one or more test pods.

9. A method for allocating test pods to a plurality of computing devices, the method comprising:

receiving a test plan for testing a device-under-test (DUT), wherein the test plan comprises a plurality of test steps;

grouping the plurality of test steps into a plurality of test microservices, wherein each test microservice comprises one or more test steps, wherein each test microservice of the plurality of test microservices comprises a functionally independent subset of the plurality of test steps;

constructing an event map based on the plurality of test microservices, wherein the event map specifies functional relations for an ordered execution of the plurality of test microservices according to the test plan;

for each of the plurality of test microservices:

determining a respective event microservice corresponding to a respective test microservice of the plurality of test microservices, wherein the respective event microservice comprises a respective subset of the event map referent to the respective test microservice; and storing a respective test pod comprising the respective test microservice and the respective event microservice in the memory medium; and allocating one or more test pods stored in the memory medium to each of a plurality of computing devices for executing the test plan based on the one or more test pods on the DUT.

10. The method of claim 9, wherein each event microservice comprises one or more of:

a trigger to initiate the respective test microservice responsive to receiving an indication of completion of a first test microservice;

a trigger to pause the respective test microservice responsive to receiving an indication of a status change for a second test microservice; and a trigger to output a stop event indicating completion of the respective test microservice.

11. The method of claim 9, wherein the functional relations for the ordered execution of the plurality of test microservices comprise conditions for initiating respective ones of the plurality of test microservices, wherein the conditions are based at least in part on successful completion of other ones of the plurality of test microservices.

12. The method of claim 9, the method further comprising:

receiving user input to initiate execution of the test plan; and responsive to receiving the user input to initiate execution of the test plan, providing a trigger to one or more of the computing devices to execute one or more test microservices.

13. The method of claim 9, the method further comprising: receiving test results from the one or more test pods during execution of the test plan; responsive to receiving the test results: storing the test results in the memory medium; or displaying the test results on a display.

14. A distributed computing system configured to execute a test plan on a device-under-test (DUT), the distributed computing system comprising:

a plurality of computing devices, wherein each computing device of the plurality of computing devices comprises a respective processor coupled to a respective non-transitory computer-readable memory medium, wherein a first computing device of the plurality of computing devices has stored thereon a first test pod comprising a first test microservice comprising one or more first test steps of the test plan and a first event microservice comprising a subset of an event map referent to the first test microservice, wherein a second computing device of the plurality of computing devices has stored thereon a second test pod comprising a second test microservice comprising one or more second test steps of the test plan and a second event microservice comprising a subset of an event map referent to the second test microservice; and one or more test interfaces coupled to the plurality of computing devices and configured to execute test microservices on the DUT, wherein the distributed computing system is configured to:
- receive user input to initiate execution of the test plan on the DUT;
- responsive to receiving the user input, execute, through the one or more test interfaces and by the first computing device, the first test microservice of the first test pod;
- provide, by the first event microservice of the first test pod, an event indication to the second event microservice of the second test pod, wherein the event indication indicates an event update for the first test microservice; and
- by the second computing device of the plurality of computing devices, modify execution of the second test microservice of the second test pod responsive to receiving the event indication.

15. The distributed computing system of claim 14, wherein the event indication indicates completion of the first test microservice, and
wherein modifying execution of the second test microservice comprises initiating execution of the second test microservice.

16. The distributed computing system of claim 14, wherein the event indication indicates an error in executing the first test microservice, and
wherein modifying execution of the second test microservice comprises pausing execution of the second test microservice.

17. The distributed computing system of claim 14, wherein the event indication indicates a pause in executing the first test microservice, and
wherein modifying execution of the second test microservice comprises pausing execution of the second test microservice.

18. The distributed computing system of claim 14, wherein the first and second test microservices each comprise a respective functionally independent subset of a plurality of test steps of the test plan.

19. The distributed computing system of claim 14, wherein the distributed computing system is further configured to execute a second test plan on a second DUT in parallel with execution of the test plan on the DUT.

20. The distributed computing system of claim 14, wherein the distributed computing system further comprises:
a messaging platform, wherein the distributed computing system is further configured to:
- receive, by the messaging platform, a second event indication from an analytics data platform, wherein the second event indication indicates that a first test step of the first microservice is superfluous;
- receive, by the first computing device, the second event indication from the messaging platform; and
- responsive to the first computing device receiving the second event indication, refrain from executing the first test step in subsequent executions of the first test microservice.

* * * * *